United States Patent [19]

Salvatore

[11] Patent Number: 6,076,773
[45] Date of Patent: Jun. 20, 2000

[54] SPIN-STABILIZED SPACECRAFT AND METHODS

[75] Inventor: Jeremiah O. Salvatore, Redondo Beach, Calif.

[73] Assignee: Hughes Electronics Corporation, Los Angeles, Calif.

[21] Appl. No.: 09/058,906

[22] Filed: Apr. 10, 1998

[51] Int. Cl.$^7$ ................................................ B64G 1/24
[52] U.S. Cl. ......................... 244/164; 244/165; 244/173
[58] Field of Search ................................. 244/164, 165, 244/173, 158 R, 169

[56] References Cited

U.S. PATENT DOCUMENTS

| | | | |
|---|---|---|---|
| 3,231,223 | 1/1966 | Upper | 244/169 |
| 3,341,151 | 9/1967 | Kampinsky | 244/134 |
| 3,362,229 | 1/1968 | Trueblood | 244/169 |
| 3,384,323 | 5/1968 | Gilbert et al. | 244/169 |
| 3,877,662 | 4/1975 | Reiter et al. | 244/164 |
| 3,907,226 | 9/1975 | Neufeld et al. | 244/169 |
| 4,725,023 | 2/1988 | Shiki | 244/173 |
| 4,911,385 | 3/1990 | Agrawal et al. | 244/165 |
| 4,961,551 | 10/1990 | Rosen | 244/169 |
| 5,653,407 | 8/1997 | Bertheux et al. | 244/173 |

OTHER PUBLICATIONS

Morgan, Walter L., et al., *Communications Satellite Handbook*, John Wiley and Sons, New York, 1989, pp. 547–550.

*Primary Examiner*—Galen L. Barefoot
*Attorney, Agent, or Firm*—Terje Gudmestad; Georgann Grunebach; Michael W. Sales

[57] ABSTRACT

Spin-stabilized spacecraft are provided which facilitate simple attitude maneuvers and the use of high-gain antennas and efficient solar panels without the need for complex control systems and an excessive number of thrusters. They include a rotor and first and second spacecraft platforms wherein the rotor and the first and second spacecraft platforms are rotatably coupled together and a spin thruster system is arranged to urge and maintain the rotor in a spacecraft-stabilizing spin about the rotor axis. A first rotary-drive mechanism couples the first spacecraft platform to the rotor and a second rotary-drive mechanism couples the second spacecraft platform to the first spacecraft platform. An attitude thruster is spaced from the rotor axis and oriented to generate an axial thrust component in the rotor for synchronous control of the inertial attitude of the rotor axis. A spacecraft of the invention can orbit the earth in an orbital plane and at an orbital rate and be controlled by the steps of (a) spinning the rotor about a rotor axis with a thruster to establish a satellite-stabilizing angular rotor momentum, (b) orienting the rotor axis in an orthogonal relationship with the orbital plane, (c) rotating the first satellite platform substantially at the orbital rate to constantly direct a portion of the first satellite platform at the earth, and (d) counter-rotating the second satellite platform substantially at the orbital rate to constantly direct a portion of the second satellite platform at the sun. The orienting step (b) is simply realized by synchronously generating an axial thrust component in the rotor that is spaced from the rotor axis.

28 Claims, 6 Drawing Sheets

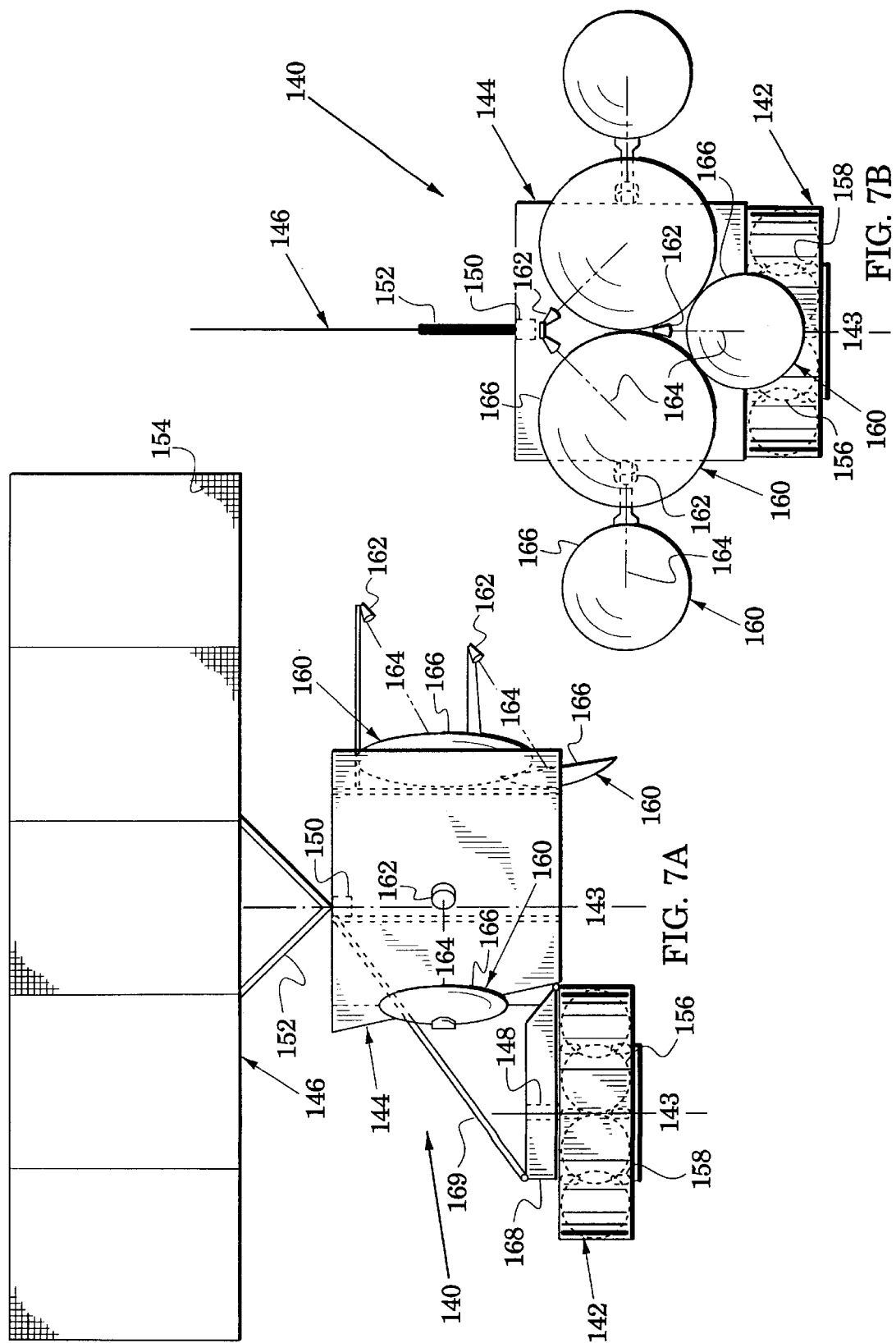

SPIN-STABILIZED SPACECRAFT AND METHODS

BACKGROUND OF THE INVENTION

1. Field of the Invention

The present invention relates generally to spacecraft and more particularly to spacecraft configurations.

2. Description of the Related Art

FIGS. 1 and 2 illustrate conventional spacecraft configurations which are described in various spacecraft references (e.g., see Morgan, Walter L., et al., *Communications Satellite Handbook*, John Wiley and Sons, New York, 1989, pp. 547–550 and Moral, G., et al., *Satellite Communications Systems*, John Wiley and Sons, New York, 1996, pp. 511–520). In particular, FIG. 1 illustrates an exemplary spin-stabilized spacecraft 20 and FIG. 2 illustrates an exemplary body-stabilized spacecraft 40.

In spin-stabilized spacecraft, all or a significant portion of the spacecraft spins about a spin axis. When an entire spacecraft spins, it is generally referred to as a "spinner". In contrast, spacecraft which have a nonspinning shell portion are referred to as "dual spinners" or "gyrostats". For example, FIG. 1 shows a gyrostat spacecraft 20 which has a spinning drum 22 and a despun shelf 24. The drum spins about a spin axis 25 and is typically cylindrical with its outer surface carrying a solar cell array 26. In addition to this array, the drum 22 usually contains batteries, fuel tanks and thrusters.

The spacecraft's payload is generally mounted on the despun shelf 24. In FIG. 1, this payload is symbolized by broken lines 28 and a payload portion is exemplified by an antenna 30 which has a feed assembly 31 that transmits and receives signals 32 that are reflected off of a reflector 33.

The reflector 33 is carried at the end of a boom 34.

In order for spacecraft to meet their design objectives, their attitudes must typically remain within predetermined attitude envelopes. However, spacecraft are typically subjected to disturbance torques from a variety of external sources (e.g., solar pressures and gravity gradients). Because these disturbance torques will eventually rotate a spacecraft out of its attitude envelope, spacecraft attitude is generally controlled with control systems that include onboard torque generators (e.g., thrusters). The efficiency and lifetime of these control systems are enhanced if the spacecraft has a degree of natural stabilization.

Spin-stabilized spacecraft obtain their attitude stabilization via the gyroscopic principal. A disturbance torque T that is applied to a nonspinning spacecraft along an axis about which the spacecraft has a moment of inertia I will urge the spacecraft to rotate about that axis with a constant angular acceleration T/I. This angular acceleration will quickly rotate the spacecraft to the limit of its attitude envelope and, therefore, quickly require corrective control action.

In contrast, if the gyrostat 20 of FIG. 1 has a angular momentum H about its spin axis 25 and is subjected to the same disturbance torque T about an axis that is orthogonal to the spin axis, the spacecraft will rotate about a third orthogonal axis with an angular velocity T/H. Because an acceleration has been converted to a velocity and because the angular momentum H can be made quite large, the time before a corrective action is required has been greatly extended.

The body-stabilized spacecraft 40 of FIG. 2 has a pair of solar panels 41 and 42 which extend away from a nonrotating body 44. One side of each of the solar panels is covered with a solar cell array 46. The satellite's payload is carried within or on the body 44. In the case of a communications spacecraft, the payload typically includes antennas 48.

The attitude of a body-stabilized spacecraft which moves in an orbital plane about a celestial body is often referenced to an orthogonal coordinate system having pitch, yaw and roll axes. The pitch axis is orthogonal to the orbital plane, the yaw axis points to the celestial body and the roll axis is aligned with the spacecraft's velocity vector. In a geostationary orbit, the solar wings 41 and 42 are typically oriented along the pitch axis.

The body-stabilized spacecraft 40 lacks the attitude stabilization that the spin-stabilized spacecraft 20 of FIG. 1 gains from its spinning body. This stabilization is replaced with an attitude control system that typically includes flywheels whose rotation provides an on-board angular momentum.

FIGS. 3A–3C show schematized views of the spacecraft 40 of FIG. 2 with FIGS. 2 and 3A–3C having like elements indicated by like reference numbers. These figures illustrate exemplary stabilization elements for body-stabilized spacecraft.

In FIG. 3A, an attitude control system includes a single spinning flywheel 50 which is typically referred to as a momentum wheel. The angular momentum H of the momentum wheel 50 provides a measure of gyroscopic rigidity (similar to that provided in the spin-stabilized spacecraft 20 of FIG. 1 by the spinning spacecraft body 22). In particular, the gyroscopic rigidity of the momentum wheel 50 limits movement about the roll and yaw axes and pitch attitude control is realized by modulating the wheel's velocity to thereby exchange momentum between the wheel and the spacecraft's body 44.

Roll attitude control is obtained with an actuator (e.g., a thruster, magnetic coil, or use of the solar wings as solar pressure sails) which can generate attitude-correction torque about this axis. In the course of the orbit, there is an interchange every 6 hours between the roll and yaw axes so that yaw control is facilitated through roll control.

In the control system of FIG. 3A, the amplitude of the angular momentum H can be altered but not its orientation. This single degree of freedom is expanded to two degrees of freedom in FIG. 3B by adding a second momentum wheel 51 and inclining the wheel's axes relative to each other. The wheels 50 and 51 now have momentums $H_1$ and $H_2$ respectively. This system permits the orientation of the combined angular momentum to be changed so that the attitude of a spacecraft element (e.g., an antenna) can be rotated to a desired inertial attitude (i.e., the control system of FIG. 3B is more agile than that of FIG. 3A).

Because the momentum wheels of FIGS. 3A and 3B maintain a significant angular momentum at all times, attitude control systems of this type are referred to as "biased-momentum systems". However, spacecraft agility is enhanced if stored momentum is kept low because this facilitates rapid attitude corrections. FIG. 3C shows a control system which includes three reaction wheels 60, 61 and 62 that are each aligned with one of three orthogonal spacecraft axes. The velocity of reaction wheels can be varied in either direction from a rest state in which they have no velocity. Accordingly, the attitude control systems of such body-stabilized spacecraft are referred to as zero-momentum systems.

With this system, disturbance torques are corrected by continually varying the wheel velocities. Because the mean wheel velocity is near zero, gyroscopic rigidity of the wheels is minimal which facilitates quick attitude changes. However, realizing this agility not only requires a reaction-wheel system but typically also requires addition of control systems with complex, costly elements (e.g., gyroscopic inertial reference units, static earth sensors, magnetometers, star sensors and control processors). In addition, a large number of thrusters are needed to unload the wheels' momentum when it becomes excessive.

Although conventional spacecraft configurations (e.g., those exemplified in FIGS. 1, 2 and 3A–3C) have successfully stabilized a large number of existing spacecraft, they have several disadvantages. Because the antennas of spinner spacecraft must also spin, they are inherently low gain structures (e.g., omni or toroidal antennas). Although gyrostat spacecraft can carry high gain antennas, both spinner and gyrostat spacecraft have inefficient solar arrays. At any given time, one half of the solar cells of their arrays are in shadow and the effectiveness of most cells of the remaining one half is reduced because they are angled away from the sun. A small portion of a gyrostat's solar cells would meet its energy needs if fully exposed to solar radiation. The weight of the additional solar cells must be subtracted from the spacecraft's payload which significantly reduces the spacecraft's revenues.

Body-stabilized spacecraft can carry high-gain antennas and efficient planar solar panels. However, momentum-biased systems lack attitude agility and zero-momentum systems require complex control systems and a large number of momentum-unloading thrusters.

SUMMARY OF THE INVENTION

The present invention is directed to spacecraft configurations which facilitate simple attitude maneuvers and the use of high-gain antennas and efficient solar panels without the need for complex control systems and an excessive number of thrusters.

These goals are achieved with a spin-stabilized spacecraft that has a rotor and first and second spacecraft platforms wherein the rotor and the first and second spacecraft platforms are rotatably coupled together and a spin thruster system is arranged to urge and maintain the rotor in a spacecraft-stabilizing spin about the rotor axis.

Preferably, the spacecraft includes a first rotary-drive mechanism which couples the first spacecraft platform to the rotor and a second rotary-drive mechanism which couples the second spacecraft platform to the first spacecraft platform. Thus, the inertial attitude of the first and second spacecraft platforms are responsive to the first and second rotary-drive mechanisms. Preferably, the spacecraft also includes an attitude thruster that is spaced from the rotor axis and oriented to generate an axial thrust component in the rotor for synchronous control of the inertial attitude of the rotor axis.

Spacecraft of the invention are suited for orbits of all altitudes and orbital rates and their structures facilitate simple spacecraft control methods. For example, a satellite orbiting the earth in an orbital plane and at an orbital rate can be controlled by: (a) spinning the rotor about a rotor axis with a thruster to establish a satellite-stabilizing angular rotor momentum, (b) orienting the rotor axis in an orthogonal relationship with the orbital plane, (c) rotating the first satellite platform substantially at the orbital rate to constantly direct a portion of the first satellite platform at the earth, and (d) counter-rotating the second satellite platform substantially at the orbital rate to constantly direct a portion of the second satellite platform at the sun. The orienting step (b) is simply realized by synchronously generating an axial thrust component.

The novel features of the invention are set forth with particularity in the appended claims. The invention will be best understood from the following description when read in conjunction with the accompanying drawings.

BRIEF DESCRIPTION OF THE DRAWINGS

FIGS. 7A and 7B are side and front elevation views of another spacecraft of the present invention.

DETAILED DESCRIPTION OF THE PREFERRED EMBODIMENTS

Figure 1:
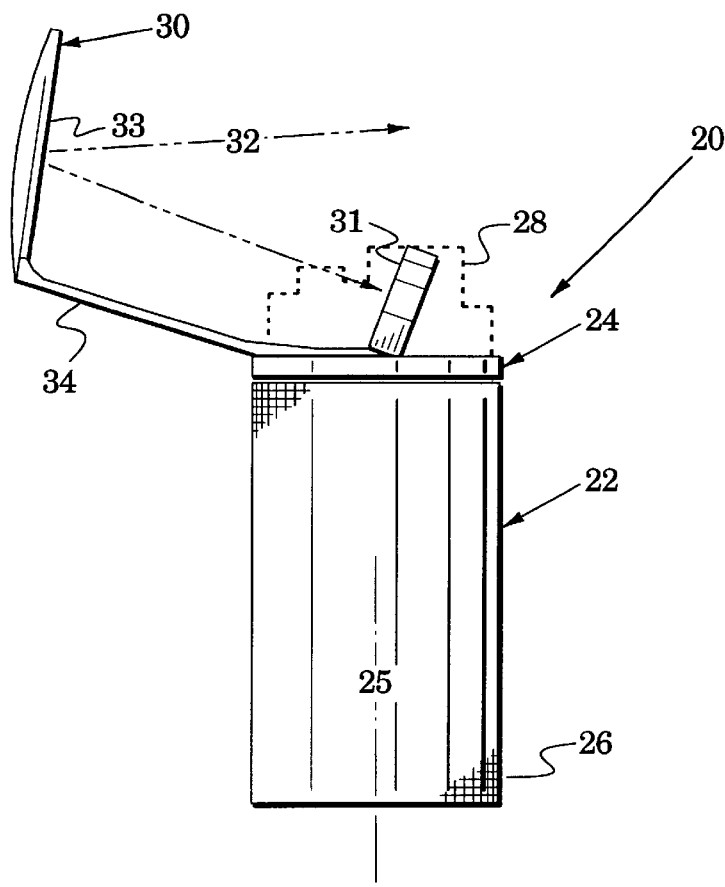
FIG. 1 is a side elevation view of a conventional spin-stabilized spacecraft.
Figure 2:
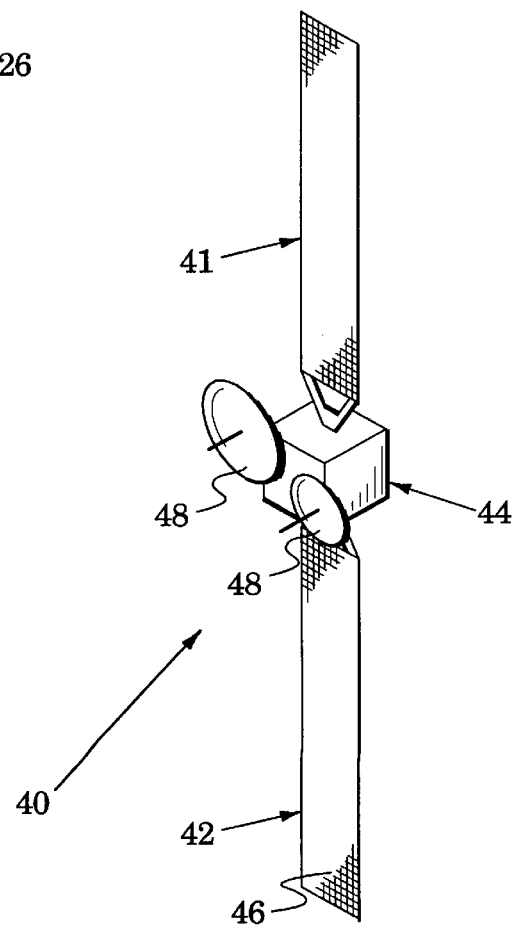
FIG. 2 is a perspective view of a conventional body-stabilized spacecraft.
Figure 3A:
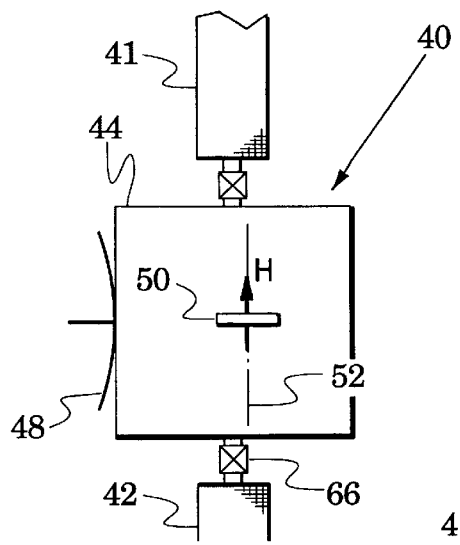
FIG. 3A is a partial side elevation view of the spacecraft of FIG. 2 which illustrates an element of an exemplary bias-momentum stabilization system.
Figure 3B:
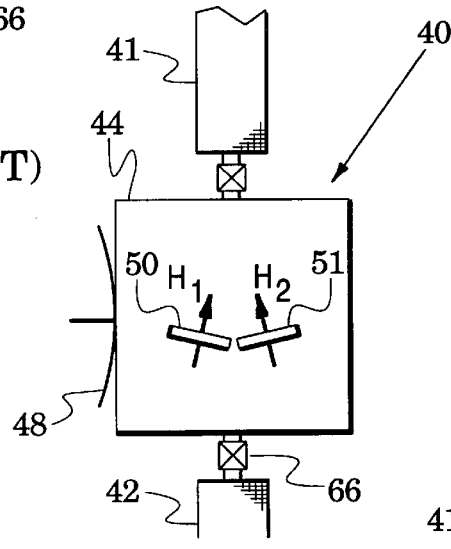
FIG. 3B is a view similar to FIG. 3A which illustrates elements of another exemplary bias-momentum stabilization system.
Figure 3C:
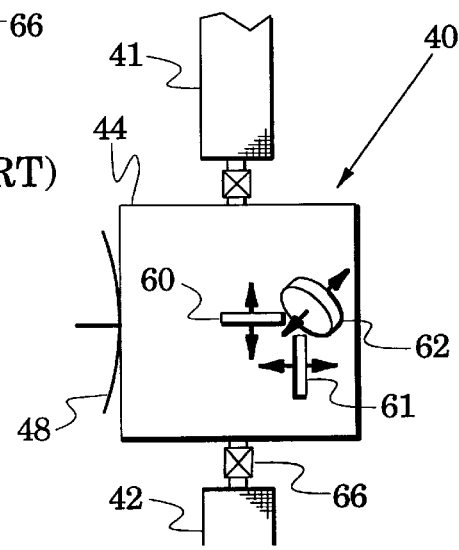
FIG. 3C is a view similar to FIG. 3A which illustrates elements of an exemplary zero-momentum stabilization system.
Figure 4:
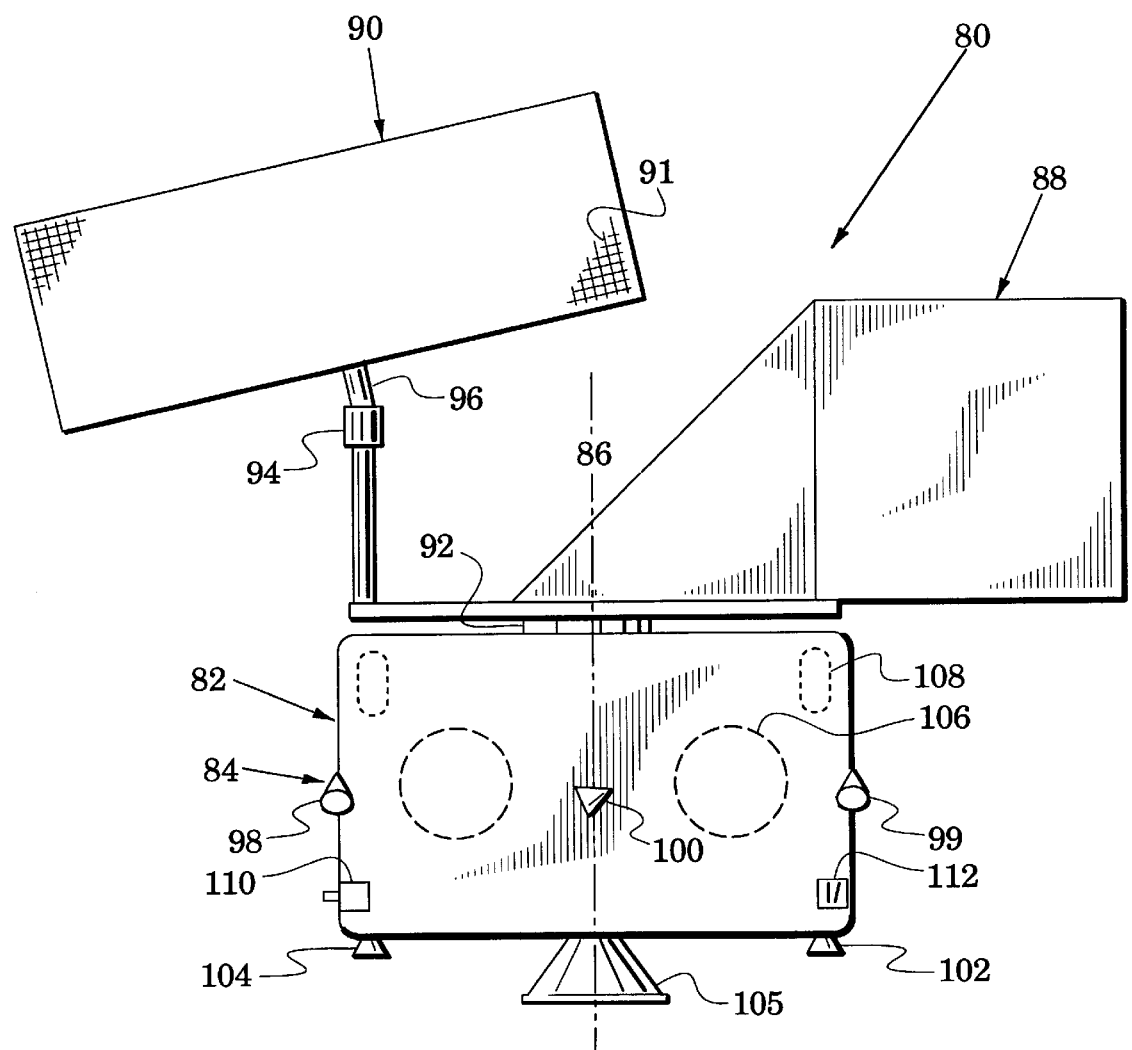
FIG. 4 is a schematized side elevation view of a spacecraft of the present invention.

FIG. 4 illustrates a spacecraft 80 which has a rotor 82, first and second spacecraft platforms and a spin thruster system 84. The rotor and the first and second platforms are rotatably coupled together and the spin thruster system is arranged to urge and maintain the rotor 82 in a spacecraft-stabilizing spin about a rotor axis 86.

In the spacecraft embodiment 80, the first spacecraft platform is a payload platform 88 and the second platform is a solar panel 90 which carries a solar cell array 91. A first rotary-drive mechanism 92 couples the payload platform 88 to the rotor 82 and a second rotary-drive mechanism 94 couples the solar panel 90 to the payload platform 88. In addition, a tilt mechanism 96 tiltably couples the solar panel 90 and the second rotary-drive mechanism 94.

The spin thruster system 84 includes a first spin thruster 98 which is oriented to generate a first tangential thrust component in the rotor 82 and a second spin thruster 99 which is oriented to generate a second tangential thrust component that rotatably opposes the first tangential thrust component. The spin thruster system 84 also preferably includes a pair of backup spin thrusters of which one thruster 100 is visible in FIG. 4. Preferably, the thrusters of the spin thruster system 84 are also tilted to each generate an axial thrust component in the rotor 82.

The rotor 82 also carries an attitude thruster 102 which is spaced from the rotor axis 86 and oriented to generate an axial thrust component in the rotor 82. The attitude thruster 102 is backed up by a backup attitude thruster 104. The backup spin and attitude thrusters insure control of the spacecraft 80 in the event of failure of one or more of the primary thrusters. The spacecraft 80 may also include other thrusters such as the axially positioned liquid apogee motor (LAM) 105 which is particularly suited for effecting orbital maneuvers (e.g., transition from a transfer orbit to a geostationary orbit).

A plurality of fuel tanks 106 and a plurality of batteries 108 are carried by the rotor 82. Spacecraft energy is stored in the batteries and the fuel tanks are coupled to deliver fuel to the spin and attitude thrusters. Celestial-body sensors in the form of an earth sensor 110 and a sun sensor 112 are also carried by the rotor 82.

In addition to an electric motor, the first rotary-drive mechanism 92 preferably includes rotation bearings and a power-transfer assembly (e.g., one including slip rings) to couple electrical power and electric signals between the rotor 82 and the payload platform 88. Similar mechanisms have been used in various conventional spacecraft and are sometimes referred to as a bearing and power transfer assembly (BAPTA) motor. Exemplary versions of the second rotary-drive mechanism 94 and the tilt mechanism 96 have also been used in conventional spacecraft and are sometimes referred to as a solar wing drive (SWD) and an adjustable solar wing assembly (ASWA) respectively.

Figure 5:
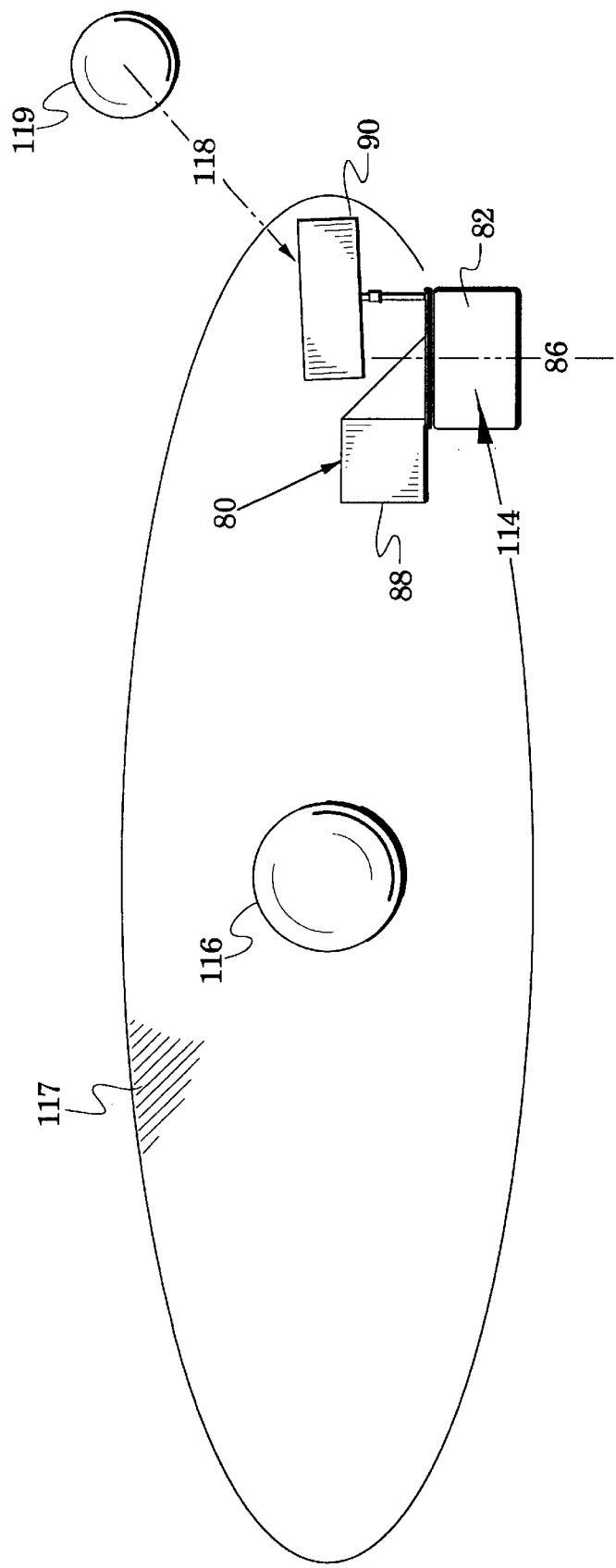
FIG. 5 is a perspective view of the spacecraft of FIG. 4 in orbit about the earth.

An operational use of the spacecraft 80 is shown in FIG. 5 where it travels along an orbital path 114 as it orbits the earth 116 in an orbital plane 117 and at an orbital rate. In this orbit, the thrusters of the spin thruster system (84 in FIG. 4) are fired as required to speed up and slow down the spin rate of the rotor 82 and thereby maintain its angular velocity at a predetermined rate (e.g., in the range of 5 to 100 revolutions per minute).

In addition, the attitude thruster (102 of FIG. 4) is fired in synchronism with the rotor spin rate to change the attitude of the rotor axis 86 as required to keep it in an orthogonal relationship with the orbital plane 117 (i.e., along an axis generally referred to in body-stabilized spacecraft as a pitch axis).

The attitude thruster can be considered to lie on a first transverse axis of the spacecraft 80. If the rotor were not spinning, the axially-oriented thrust of the attitude thruster would induce a torque in the spacecraft about a second transverse spacecraft axis that is orthogonal to the first transverse axis. However, the angular momentum of the rotor gyroscopically converts this torque into one about the first transverse axis.

Because the attitude thruster is mounted on the spinning rotor, it can be synchronously fired at any angle about the rotor axis 86 to thereby move the axis to any desired inertial attitude. Pulsed input signals from celestial-body sensors such as the spinning earth sensor (110 in FIG. 4) and sun sensor (112 in FIG. 4) provide the inertial information required to time the synchronous firing of the attitude thruster.

The spinning rotor has a large moment of inertia which causes its angular momentum to be considerably larger than any other motion-induced momentum in the spacecraft 80. The rotor's moment of inertia is enhanced by the weight of elements that are carried by it (e.g., the fuel tanks (106 in FIG. 4) and the batteries (108 in FIG. 4)). Accordingly, the effects of disturbance torques upon the attitude of the spacecraft 80 are greatly reduced and the attitude of the rotor axis requires only an occasional realignment.

The large angular momentum of the spinning rotor and its orthogonal orientation to the orbital plane 117 also facilitates a simple rotation of the payload platform 88 at the orbital rate to keep a portion of it (e.g., communication antennas) directed at the earth 116. The momentum and its orientation further facilitates a simple counter-rotation of the solar panel 90 at the orbital rate to keep its solar cell array (91 in FIG. 4) directed along a sun line 118 to the sun 119. These rotations are effected respectively with the first and second rotary-drive mechanisms (92 and 94 in FIG. 4). When there is an appreciable sun elevation with respect to the orbital plane 117, the exposure of the solar array to the sun can be enhanced by tilting it with the tilt mechanism (96 in FIG. 4).

Because of disturbances from various celestial sources, errors in the inclination and eccentricity of the spacecraft's orbital path 114 generally develop over time. The same disturbances cause the spacecraft 80 to drift from its desired station relative to the rotating earth 116. The first and second spin thrusters (98 and 99 in FIG. 4) can be synchronously fired together to correct eccentricity and drift errors with their tangential thrust components. Undesired inclination disturbances due to their axial thrust components can be avoided by firing at first and second opposed sides of the orbital path 114.

The first and second spin thrusters (98 and 99 in FIG. 4) can also be synchronously fired together to correct inclination errors with their axial thrust components. Undesired eccentricity disturbances due to their tangential thrust components can be avoided by firing at first and second opposed sides of the orbital path 114.

Because of its configuration, the spacecraft 80 of FIG. 4 displays significant operational and control advantages when compared to conventional spacecraft. As opposed to the low-gain antennas of spinner spacecraft, it can carry high-gain antennas on at least one of its spacecraft platforms. In contrast to the inefficient cylindrical solar cell arrays of spinner and gyrostat spacecraft, the planar solar panel 90 can be steered to be in an efficient orthogonal relationship with a sun line (118 in FIG. 5).

Control of its spin rate, spin axis attitude and stationkeeping (i.e., control of inclination, eccentricity and drift) is effected with three thrusters (six with backup thrusters) in the spacecraft 80. In contrast, control of body-stabilized spacecraft typically requires six thrusters (two spaced from each of the spacecraft's roll, pitch and yaw axes) which become twelve with backup thrusters.

Because the attitude of the platforms of the invention can be easily and efficiently altered, they can carry other thrusters (e.g., ion engines) for effecting various orbit maneuvers (e.g., orbit raising, deorbiting and stationkeeping).

Body-stabilized spacecraft typically require a propulsion management system to urge thruster fuel from fuel tanks to thrusters. This system includes various fuel-directing structures (e.g., valves and traps). Because of the centrifugal forces generated by the spinning rotor 82, fuel can be automatically urged from the fuel tanks 106 to the spin thrusters 98 and 99 and the attitude thruster 102.

Conventional spacecraft typically require heat pipes to conduct heat away from their batteries. In contrast, the batteries 108 are carried on the rotor 82 and easily positioned for direct heat radiation into space.

As previously mentioned, attitude control of body-stabilized spacecraft generally requires the use of complex attitude sensors, actuators and controllers (e.g., gyroscopic inertial reference units, static earth sensors, magnetometers star sensors, reaction or momentum wheels and control processors). These complex attitude control systems are not required in the spacecraft 80. Instead, accurate attitude control (e.g., better than 0.1 degree) is obtained by controlling rotation and counter-rotation of the payload platform 88 and solar panel 90. This can be effected with a simple attitude control electronics coupled between simple spinning sensors (e.g., the earth and sun sensors 110 and 112) and the first and second rotary-drive mechanisms 92 and 94.

Various disturbance forces can cause the rotor axis 86 to nutate or "cone". In the spacecraft 80, this nutation can be damped out by coupling the signal from a rotor-mounted accelerometer to the first rotary-drive mechanism 92. In operation of this damping system, torque variations are applied to the first and second spacecraft platforms 88 and 90 and timed so that they decrease the nutation.

Figure 6:
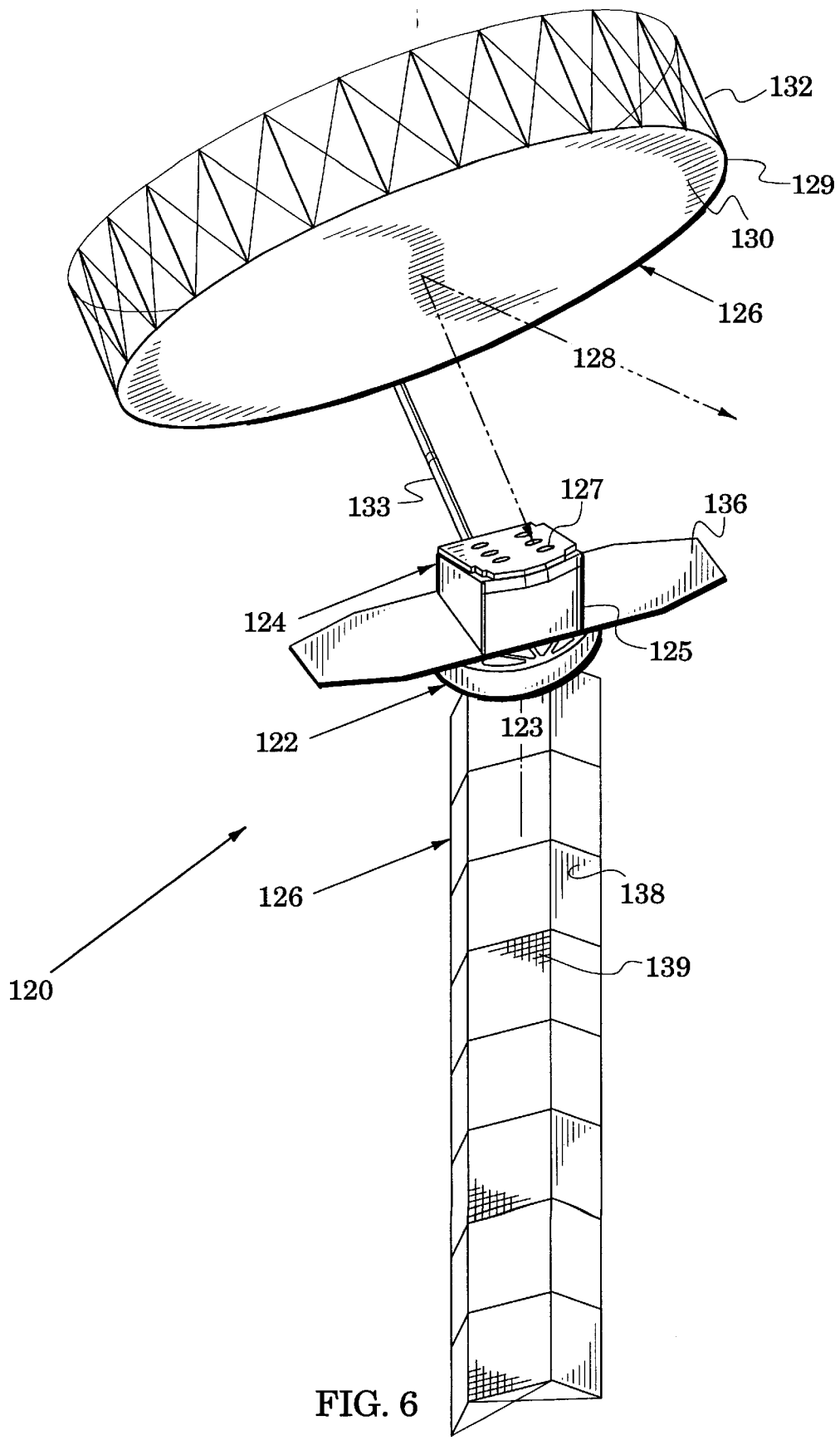
FIG. 6 is a perspective view of another spacecraft of the present invention.

FIG. 6 illustrates another spacecraft embodiment 120 whose configuration is similar to the spacecraft 80 of FIG. 4. In particular, the spacecraft 120 has a rotor 122 which spins about a rotor axis 123, a payload platform 124 and a solar panel 121. The rotor 122 carries spin thrusters (not shown) which maintain a spacecraft-stabilizing spin of the rotor 122. The rotor also carries an attitude thruster (not shown) which adjusts the inertial attitude of the rotor axis 123.

The payload platform 124 has a communications module 125 and a communications antenna 126 which includes antenna feeds 127 that receive and transmit communication signals 128 through reflections from an antenna reflector 129. The reflector 129 is formed of a tension web 130 that is stretched into a reflector shape by a hoop-truss arrangement 132. This structure can be stowed in a small volume during launch and subsequently deployed at the end of an antenna boom 133.

The payload platform also carries deployed radiators 136 which enhance heat radiation from the communication module into space. The solar panel 121 incudes tilted reflectors 138 that reflect solar radiation onto a solar cell array 139 for increased energy generation.

In contrast to the spacecraft 80, the rotation axes of the first and second spacecraft platforms 124 and 121 of the spacecraft 120 are arranged in a coaxial relationship (i.e., they both rotate about the axis 123). Although not shown, the second rotary-drive mechanism of the solar panel 121 extends through the first rotary-drive mechanism of the payload platform 124 to facilitate rotation between the solar panel and the payload platform.

FIGS. 7A and 7B illustrate another spacecraft embodiment 140 that is similar to the spacecraft 80 of FIG. 4. The spacecraft 140 has a rotor 142 which spins about a rotor axis 143, a payload platform 144 and a second spacecraft platform in the form of a solar panel 146. The payload platform 144 is rotatably coupled to the rotor 142 by a first rotary-drive mechanism 148. The payload platform is laterally offset from its rotary-drive mechanism 148 with a shelf 168 and a brace 169. The solar panel 146 carries a solar cell array 154 and is coupled to a second rotary-drive mechanism 150 by a for rotation about a parallel and offset axis 155.

The rotor 142 carries spin thrusters (not shown) which maintain a spacecraft-stabilizing spin of the rotor. The rotor also carries an attitude thruster (not shown) which adjusts the inertial attitude of the rotor axis 143. A plurality of fuel tanks 156 and a plurality of batteries 158 are carried by the rotor 142.

The payload platform 144 carries a plurality of communications antennas 160 which each includes an antenna feed 162 that receives and transmits signal radiation 164 through reflections from a corresponding antenna reflector 166.

Spacecraft of the invention are suited for orbits of all altitudes and orbital rates. As exemplified in embodiments of the invention, the first and second spacecraft platforms can house a variety of spacecraft structures and separately direct them at celestial bodies.

As a first example, the first spacecraft platform can include structures for communicating with an observing the earth (e.g., antennas, radiation sensors and weather sensors) and direct these structures at the earth by a simple rotation at the spacecraft's orbital rate. As a second example, the second spacecraft platform can include structures for receiving and observing solar radiation (e.g., solar cell arrays and solar-observation instruments) and direct these structures at the sun by a simple counter-rotation at the spacecraft's orbital rate. Although these examples envision the earth and the sun as the celestial bodies, the invention can be operated in association with other celestial bodies.

These processes of rotation and counter-rotation are facilitated by the spacecraft's inertial stability and that stability is established by the angular momentum of the spinning rotor to which the first and second platforms are coupled.

As also shown in embodiments of the invention, the first and second rotary-drive mechanisms may be coaxially arranged or can be laterally offset from one another. One platform may be coupled to another platform which is, in turn, rotatably coupled to the rotor. Alternatively, both platforms may be rotatably coupled directly to the rotor although this arrangement is more complex because both rotary-drive mechanisms are then associated with the high spin rate of the rotor.

Although spacecraft embodiments have been shown with single solar panels, the teachings of the invention also facilitate the use of multiple solar panels (e.g., panels which extend above and below the rotor). The teachings of the invention generally reduce the need for complex stabilization and attitude-control structures. However, embodiments of the invention can be supplemented by such structures in specific applications. For example, attitude control of the rotor axis may be further enhanced by adding reaction wheels to one of the spacecraft platforms. These wheels would preferably be arranged with their spin axes orthogonal to the rotor axis.

Other structures can be advantageously added to the illustrated embodiments. For example, flywheels have been used as energy sources by decreasing their rotational velocity and converting this loss of momentum to electrical energy. Conventionally, these "flywheel batteries" are used in counter-rotating pairs so that their momentum loss does not induce attitude changes in body-stabilized spacecraft. In contrast, any number of these devices can be carried on the spinning rotors of the invention because their large momentum effectively isolates the spacecraft platforms from the smaller momentum change of the flywheels.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A spin-stabilized spacecraft, comprising;
   a rotor configured for spinning about a rotor axis;
   a first spacecraft platform;
   a first rotary-drive mechanism that rotatable couples said first platform to said rotor for rotation about said rotor axis;
   a second spacecraft platform:
   a second rotary-drive mechanism that rotatably couples said second platform to said first platform for rotation about a second axis that is different from said rotor axis: and a spin thruster system carried by said rotor, said spin thruster system arranged to urge and maintain said rotor in a spacecraft-stabilizing spin about said rotor axis.

2. The spin-stabilized spacecraft of claim 1, wherein said second axis is substantially parallel to and offset from said rotor axis.

3. The spin-stabilized spacecraft of claim 1, wherein at least one of said first and second rotary-drive mechanisms is an electrical stepper motor.

4. The spin-stabilized spacecraft of claim 1, wherein said spin thruster system includes:
   a first spin thruster oriented to generate a first tangential thrust component in said rotor; and
   a second spin thruster oriented to generate a second tangential thrust component in said rotor that rotatably opposes said first tangential thrust component,
   said first and second tangential thrust components facilitating control of said spacecraft-stabilizing spin and of an orbital drift and an orbital eccentricity of said spacecraft.

5. The spin-stabilized spacecraft of claim 4, wherein said first and second spin thrusters are oriented to also generate axial thrust components in said rotor system for control of an orbital inclination of said spacecraft.

6. The spin-stabilized spacecraft of claim 1, further including an attitude thruster spaced from said rotor axis and oriented to generate an axial thrust component in said rotor for synchronous control of the inertial attitude of said rotor axis.

7. The spin-stabilized spacecraft of claim 1, further including;
   at least one fuel tank carried by said rotor and coupled to supply fuel to said spin thruster system; and
   at least one battery carried by said rotor for storing spacecraft energy.

8. The spin-stabilized spacecraft of claim 1, further including at least one celestial-body sensor carried by said rotor for sensing the inertial attitude of said rotor axis.

9. The spin-stabilized spacecraft of claim 8, wherein said celestial-body sensor is an earth sensor.

10. The spin-stabilized spacecraft of claim 8, wherein said celestial-body sensor is a sun sensor.

11. The spin-stabilized spacecraft of claim 1, wherein said first spacecraft platform is configured to carry a spacecraft payload.

12. The spin-stabilized spacecraft of claim 11, wherein said payload includes at least one antenna.

13. The spin-stabilized spacecraft of claim 1, further including a solar panel carried on said second spacecraft platform, said solar panel having a plurality of solar cells for generation of spacecraft energy.

14. The spin-stabilized spacecraft of claim 1, further including
   a tilt mechanism which tiltably couples said second platform to said second rotary-drive mechanism.

15. The spin-stabilized spacecraft of claim 14, wherein said first rotary drive mechanism is a bearing and power transfer assembly said second rotary drive mechanism is a solar wing drive and said tilt mechanism is an adjustable solar wing assembly.

16. A spin-stabilized spacecraft, comprising;
   a rotor configured for spinning about a rotor axis;
   a payload platform;
   a first rotary-drive mechanism that rotatably couples said payload platform to said rotor for rotation about said rotor axis;
   at least one solar panel for generation of spacecraft energy;
   a second rotary-drive mechanism that rotatably couples said solar panel to said payload platform for rotation about a second axis that is different from said rotor axis;
   a tilt mechanism which tilts said solar panel from said second axis;
   a spin thruster system carried by said rotor, said spin thruster system arranged to urge and maintain said rotor in a spacecraft-stabilizing spin about said rotor axis;
   an attitude thruster spaced from said rotor axis and oriented to generate an axial thrust component in said rotor for synchronous control of the inertial attitude of said rotor axis;
   at least one fuel tank carried by said rotor and coupled to supply fuel to said spin thruster system and said attitude thruster; and
   at least one battery carried by said rotor for storing spacecraft energy.

17. The spin-stabilized spacecraft of claim 16, wherein said second axis is substantially parallel to and offset from said rotor axis.

18. The spin-stabilized spacecraft of claim 16, wherein said spin thruster system includes:
   a first spin thruster oriented to generate a first tangential thrust component in said rotor; and
   a second spin thruster oriented to generate a second tangential thrust component in said rotor that opposes said first tangential thrust component,
   said first and second tangential thrust components facilitating control of said spacecraft-stabilizing spin and of an orbital drift and an orbital eccentricity of said spacecraft.

19. The spin-stabilized spacecraft of claim 18, wherein said first and second spin thrusters are oriented to also generate axial thrust components in said rotor system for control of an orbital inclination of said spacecraft.

20. The spin-stabilized spacecraft of claim 16, further including at least one celestial-body sensor carried by said rotor for sensing the inertial attitude of said rotor axis.

21. The spin-stabilized spacecraft of claim 16, further including at least one communication antenna carried by said payload platform.

22. A method of controlling an earth satellite while it orbits in an orbital plane and at an orbital rate, comprising the steps of:
   rotatably coupling a rotor and a first satellite platform for rotation about a rotor axis;
   rotatably coupling a second satellite platform to said first satellite platform for rotation about a different second axis;
   spinning said rotor about said rotor axis to establish a satellite-stabilizing angular rotor momentum;
   orienting said rotor axis in a substantially orthogonal relationship with said orbital plane;
   rotating said first satellite platform substantially at said orbital rate to constantly direct a portion of said first satellite platform at said earth; and
   counter-rotating said second satellite platform substantially at said orbital rate to constantly direct a portion of said second satellite platform at the sun.

23. The method of claim 22, wherein said second axis is substantially parallel to and offset from said rotor axis.

24. The method of claim 22, wherein said spinning step includes the steps of:

generating a first tangential thrust component in said rotor; and generating a second tangential thrust component in said rotor that opposes said first tangential thrust component;

said first and second tangential thrust components facilitating control of said satellite-stabilizing angular rotor momentum and of an orbital drift and an orbital eccentricity of said satellite.

25. The method of claim 22, wherein said orienting step includes the step of generating an axial thrust component in said rotor that is spaced from said rotor axis to thereby maintain said orthogonal relationship.

26. The method of claim 22, wherein said portion of said first satellite platform is a communication antenna.

27. The method of claim 22, wherein said portion of said second satellite platform is a solar panel face.

28. The method of claim 27, further including the step of tilting said solar panel face to enhance its exposure to the sun.

* * * * *